(12) United States Patent
Yang (10) Patent No.: US 10,728,012 B2
(45) Date of Patent: Jul. 28, 2020

(54) METHOD FOR OPERATING SWITCH AND ELECTRONIC DEVICE SUPPORTING THE SAME

(71) Applicant: Samsung Electronics Co., Ltd., Gyeonggi-do (KR)

(72) Inventor: Dongil Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 21 days.

(21) Appl. No.: 15/355,180

(22) Filed: Nov. 18, 2016

(65) Prior Publication Data

US 2017/0170947 A1    Jun. 15, 2017

(30) Foreign Application Priority Data

Dec. 9, 2015 (KR) .................. 10-2015-0174878

(51) Int. Cl.
*H04B 1/44* (2006.01)
*H04L 5/14* (2006.01)
*H04B 1/52* (2015.01)
*H04B 1/48* (2006.01)
*H04B 1/401* (2015.01)

(52) U.S. Cl.
CPC .......... *H04L 5/1461* (2013.01); *H04B 1/401* (2013.01); *H04B 1/44* (2013.01); *H04B 1/48* (2013.01); *H04B 1/52* (2013.01)

(58) Field of Classification Search
CPC ......... H04B 1/44; H04B 1/401; H04W 88/02; H04L 5/1461
See application file for complete search history.

(56) References Cited

U.S. PATENT DOCUMENTS

2009/0181630 A1   7/2009  Seshita et al.
2013/0072134 A1*  3/2013  Goto .................. H04B 1/109
                                                       455/78

(Continued)

FOREIGN PATENT DOCUMENTS

WO   WO 2013/106484    7/2013

OTHER PUBLICATIONS

European Search Report dated Apr. 13, 2017 issued in counterpart application No. 16202968.0-1874, 7 pages.

*Primary Examiner* — Lakeram Jangbahadur
(74) *Attorney, Agent, or Firm* — The Farrell Law Firm, P.C.

(57) ABSTRACT

An electronic device is provided. The electronic device includes a housing; a communication circuit in the housing and configured to generate a signal for a time division duplexer (TDD) and a frequency division duplexer (FDD); an antenna electrically connected with the communication circuit; a plurality of electrical paths; and a control circuit, wherein each electrical path comprises a first transistor configured to connect with each electrical path in series, and a second transistor configured to connect with each electrical path and a ground, wherein the control circuit is configured to receive a wireless signal, select at least one of the TDD and the FDD to transmit the received wireless signal, and selectively activate a first transistor and a second transistor disposed in at least one electrical path and first and second transistors disposed in at least another electrical path among the plurality of electrical paths based on the selection.

14 Claims, 9 Drawing Sheets

(56) References Cited

U.S. PATENT DOCUMENTS

| | | | |
|---|---|---|---|
| 2013/0093524 A1* | 4/2013 | Nakamura | H03L 7/02 331/34 |
| 2013/0107763 A1* | 5/2013 | Uyehara | H04B 7/024 370/278 |
| 2013/0157717 A1* | 6/2013 | Yu | H04B 1/0057 455/553.1 |
| 2013/0194158 A1* | 8/2013 | Chen | H01Q 1/50 343/876 |
| 2014/0009213 A1 | 1/2014 | Sprinkle et al. | |
| 2014/0009214 A1 | 1/2014 | Altunkilic et al. | |
| 2014/0011463 A1 | 1/2014 | Madan et al. | |
| 2014/0035092 A1 | 2/2014 | Kjar | |
| 2014/0167834 A1* | 6/2014 | Stuber | H01L 27/1203 327/382 |
| 2014/0170994 A1 | 6/2014 | Dupuy et al. | |
| 2014/0300525 A1 | 10/2014 | Lee et al. | |
| 2014/0333384 A1 | 11/2014 | Gill | |
| 2015/0015321 A1 | 1/2015 | Dribinsky et al. | |
| 2015/0022256 A1 | 1/2015 | Sprinkle et al. | |
| 2015/0041917 A1 | 2/2015 | Zhu et al. | |

* cited by examiner

FIG. 7

METHOD FOR OPERATING SWITCH AND ELECTRONIC DEVICE SUPPORTING THE SAME

PRIORITY

This application claims priority under 35 U.S.C. § 119(a) to a Korean Patent Application filed on Dec. 9, 2015 in the Korean Intellectual Property Office and assigned Serial No. 10-2015-0174878, the entire disclosure of which is incorporated herein by reference.

BACKGROUND

1. Field of the Disclosure

The present disclosure relates generally to a method for operating a switch and an electronic device supporting the same, and more particularly, to a method for operating a switch and an electronic device supporting the same in order to avoid distortion and loss of an antenna signal in a case where a sudden high electrical current is engaged.

2. Description of the Related Art

Generally, antennas may be equipped with an antenna switch divided into several steps for receiving signals having various frequency bands. For example, signals having various frequency bands may include a mobile communication signal for receiving a mobile communication service, a Bluetooth (BT) signal for receiving a BT communication service, and a wireless fidelity (WiFi) signal for receiving a WiFi communication service. An antenna switch provides support that enables an antenna to use a signal by dividing the signal into a plurality of frequency bands. In this case, an antenna switch may be configured with a plurality of transistors.

An antenna switch configured with a plurality of transistors may generate antenna mismatching if a sudden high electrical current is engaged. If antenna mismatching is generated, transistors may break down and signals may be distorted or damaged because of a malfunction of the antenna.

SUMMARY

An aspect of the present disclosure provides a method for operating a switch and an electronic device supporting the same in order to avoid distortion and loss of an antenna signal in a case where a sudden high electrical current is engaged.

Another aspect of the present disclosure avoids breakdowns of transistors by controlling to switch off transistors connected to electrical paths other than an electrical path corresponding to a time division duplexer (TDD).

In accordance with an aspect of the present disclosure, an electronic device is provided. The electronic device includes a housing; a communication circuit disposed in the housing and configured to generate a signal for a TDD and/or a frequency division duplexer (FDD); an antenna electrically connected with the communication circuit; a plurality of electrical paths configured to connect the communication circuit and the antenna electrically; and a control circuit configured to connect with the communication circuit, the antenna, and the plurality of electrical paths, wherein each electrical path included in the plurality of electrical paths comprises a first transistor configured to connect with each electrical path in series, and a second transistor configured to connect with each electrical path and a ground, wherein the control circuit is configured to receive a wireless signal, select at least one of the TDD and the FDD in order to transmit the received wireless signal, and selectively activate a first transistor and a second transistor disposed in at least one electrical path and first and second transistors disposed in at least another electrical path among the plurality of electrical paths based on the selection.

In accordance with another aspect of the present disclosure, a method for operating a switch is provided. The method includes receiving a wireless signal, selecting one of a TDD and an FDD to transmit the received wireless signal, and selectively activating a first transistor and a second transistor disposed in at least one electrical path and first and second transistors disposed in at least another electrical path among a plurality of electrical paths based on the selection.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION

The following description with reference to the accompanying drawings is provided to assist in a comprehensive understanding of various embodiments of the present disclosure as defined by the appended claims and their equivalents. It includes various details to assist in that understanding, but these are intended to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

In various embodiments of the present disclosure, the expressions "or" and "at least one of A and/or B" include any or all of the combinations of words listed together. For example, the expressions "A or B" and "at least A and/or B" may include A, B, or both A and B.

The expressions "1," "2," "first," and "second" used in various embodiments of the present disclosure may modify various components of the various embodiments but are not intended to limit the corresponding components. For example, the above expressions are not intended to limit the sequence and/or importance of the components. The expressions may be used for distinguishing one component from other components. For example, a first user device and a second user device indicate different user devices although both of them are user devices. For example, without departing from the scope and spirit of the present disclosure, a first structural element may be referred to as a second structural element. Similarly, a second structural element may also be referred to as a first structural element.

If it is stated that a component (e.g., a first component) is "coupled to" or "connected to" another component (e.g., a second component), the component may be directly coupled to the other component, or coupled to the other component through a new component (e.g., a third component). In contrast, if it is stated that a component (e.g., a first component) is "directly coupled to" or "directly connected to" another component (e.g., a second component), a new component (e.g., a third component) does not exist between the component and the other component.

In the following description, the expression "configured to" may be interchangeably used with the expressions "suitable for," "having a capability of," "changed to," "made to," "capable of," and "designed for" in hardware or software. The expression "device configured to" may denote that a device is "capable of" with other devices or components. For example, if it is mentioned that a processor is configured to perform A, B, and C, it may be understood that the processor (e.g., a central processing unit (CPU) and an application processor (AP)) is capable of performing corresponding operations by executing software programs dedicated to the corresponding operations.

The terms used in describing various embodiments of the present disclosure are only examples for describing a certain embodiment but are not intended to limit the various embodiments of the present disclosure. Unless defined differently, all terms used herein, have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present description.

According to various embodiments of the present disclosure, examples of an electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an moving picture experts group phase 1 or phase 2 (MPEG-1 or MPEG-2) audio layer 3 (MP3) player, a medical device, a camera, and a wearable device. Examples of a wearable device may include an accessory type device (such as, a watch, a ring, a bracelet, an ankle bracelet, a necklace, glasses, a contact lens, a head-mount device (HMD), a textile or clothes type device (such as electronic clothes), a body-attached type device (such as a skin pad and a tattoo), and a bio-implemented type device.

According to an embodiment of the present disclosure, examples of an electronic device may include a television, a digital versatile disc (DVD) player, an audio player, a refrigerator, an air conditioner, a cleaner, an oven, a microwave oven, a washing machine, an air purifier, a set-top box, a home automation control panel, a security control panel, a media box (such as Samsung HomeSync®, Apple TV®, and Google TV™), a game console (such as Xbox® and PlayStation®), an electronic dictionary, an electronic key, a camcorder, and an electronic frame.

According to an embodiment of the present disclosure, examples of an electronic device may include a medical device (such as portable medical sensors (including a glucometer, a heart rate sensor, a tonometer, and body thermometer), a magnetic resonance angiography (MRA) device, a magnetic resonance imaging (MRI) device, a computed tomography (CT) device, a camcorder, and a microwave scanner), a navigation device, a global navigation satellite system (GNSS), an event data recorder (EDR), a flight data recorder (FDR), an automotive infotainment device, marine electronic equipment (such as a marine navigation system and a gyro compass), aviation electronics (avionics), an automotive head unit, an industrial or household robot, an automated teller machine (ATM), a point of sales (POS) terminal, and an Internet-of-Things (IoT) device (such as a light bulb, a sensor, a sprinkler system, a fire alarm system, a temperature controller, a street lamp, a toaster, fitness equipment, a hot water tank, a heater, and a boiler).

According to an embodiment of the present disclosure, examples of an electronic device may include furniture, a building/structure, a part of a vehicle, an electronic board, an electronic signature receiving device, a projector, and a sensor (such as water, electricity, gas, and electric wave meters). According to various embodiments of the present disclosure, an electronic device may be flexible or a combination of at least two of the aforementioned devices.

According to an embodiment of the present disclosure, an electronic device is not limited to the aforementioned devices. In the present disclosure, the term "user" may denote a person who uses an electronic device or a device (e.g., an electronic device for artificial intelligence) which uses an electronic device.

Figure 1:
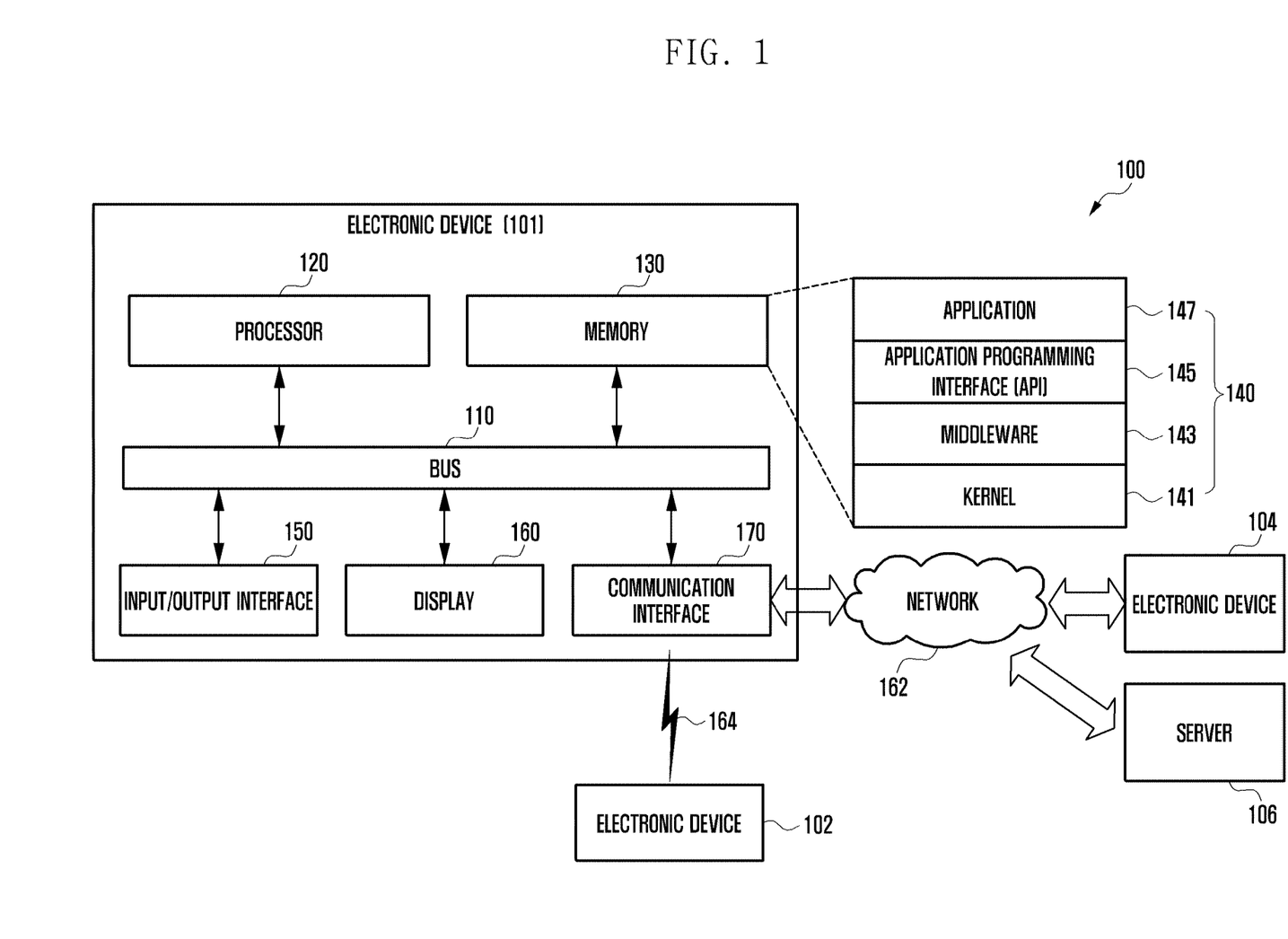
FIG. 1 is a block diagram of a network environment according to an embodiment of the present disclosure.

FIG. 1 is a block diagram of a network environment 100 according to an embodiment of the present disclosure.

Referring to FIG. 1, an electronic device 101, in the network environment 100, includes a bus 110, a processor 120, a memory 130, an input/output interface 150, a display 160, and a communication interface 170. According to an embodiment of the present disclosure, the electronic device 101 may omit at least one of the components 110, 120, 130, 140, 150, 160, and 170 or further include another component.

The bus 110 may be a circuit connecting the above described components 110, 120, 130, 140, 150, 160, and 170 and transmitting communication (e.g., a control message) between the above described components 110, 120, 130, 140, 150, 160, and 170.

The processor 120 may include one or more of a CPU, an AP or a communication processor (CP). For example, the processor 120 may control at least one component 110, 120, 130, 140, 150, 160, and 170 of the electronic device 101 and/or execute a calculation relating to communication or data processing.

The memory 130 may include volatile and/or non-volatile memory. For example, the memory 130 may store a command or data relating to at least one component of the electronic device 101. According to an embodiment of the present disclosure, the memory may store software and/or a program 140. For example, the program 140 may include a kernel 141, middleware 143, an application programming interface (API) 145, and/or an application 147 and so on. At least one portion of the kernel 141, the middleware 143 and the API 145 may be defined as an operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components 110, 120, 130, 140, 150, 160, and 170 of the electronic device 101 from the middleware 143, the API 145, or the application 147 to control or manage the components 110, 120, 130, 140, 150, 160, and 170.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 143 and includes, for example, at least one interface or function (e.g., a command) for a file control, a window control, image processing, or a character control.

The input/output interface 150 may be an interface to transmit a command or data inputted by a user or another external device to another component(s) of the electronic device 101. Further, the input/output interface 150 may output a command or data received from another component(s) of the electronic device 101 to a user or another external device.

The display 160 may include, for example, a liquid crystal display (LCD), a light emitting diode (LED), an organic LED (OLED), or a micro electro mechanical system (MEMS) display, or an electronic paper display. The display 160 may display, for example, various contents (text, image, video, icon, or symbol, and so on) to a user. The display 160 may include a touch screen, and receive a touch, a gesture, an approaching, or a hovering, input using a part of the body of a user.

The communication interface 170 may establish communication between the electronic device 101 and an external device (e.g., a first external device 102, a second external device 104, or a server 106). For example, the communication interface 170 may be connected with a network 162 through wireless communication 164 or wired communication and communicate with an external device (e.g., a second external device 104 or server 106).

Wireless communication may use, as a cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication 164 may include, for example, at least one of WiFi, BT, near field communication (NFC), magnetic secure transmission or near field magnetic data stripe transmission (MST), global navigation satellite system (GNSS), and the like. The GNSS may include at least one of, for example, a global positioning system (GPS), a Global navigation satellite system (Glonass), a Beidou Navigation Satellite System (Beidou), and Galileo (European global satellite-based navigation system). Hereinafter, "GPS" may be interchangeably used with "GNSS" in the present disclosure. Wired communication may include, for example, at least one of a universal serial bus (USB), a high definition multimedia interface (HDMI), a recommended standard-232 (RS-232), a plain old telephone service (POTS), and the like. The network 162 may include a telecommunication network, for example, at least one of a computer network (e.g., a local area network (LAN) or a wide area network (WAN), the Internet, and a telephone network.

Each of the first external device 102 and the second external device 104 may be the same type or a different type of device than the electronic device 101. According to an embodiment of the present disclosure, the server 106 may include one or more group of servers. At least one portion of executions executed by an electronic device may be performed by one or more electronic devices 102 and 104, and the server 106. If the electronic device 101 performs a function or service automatically, the electronic device 101 may request performing of at least one function to external electronic devices 102 and 104, or the server 106. For the above, cloud computing technology, distributed computing technology, or client-server computing technology may be used, for example.

Figure 2A:
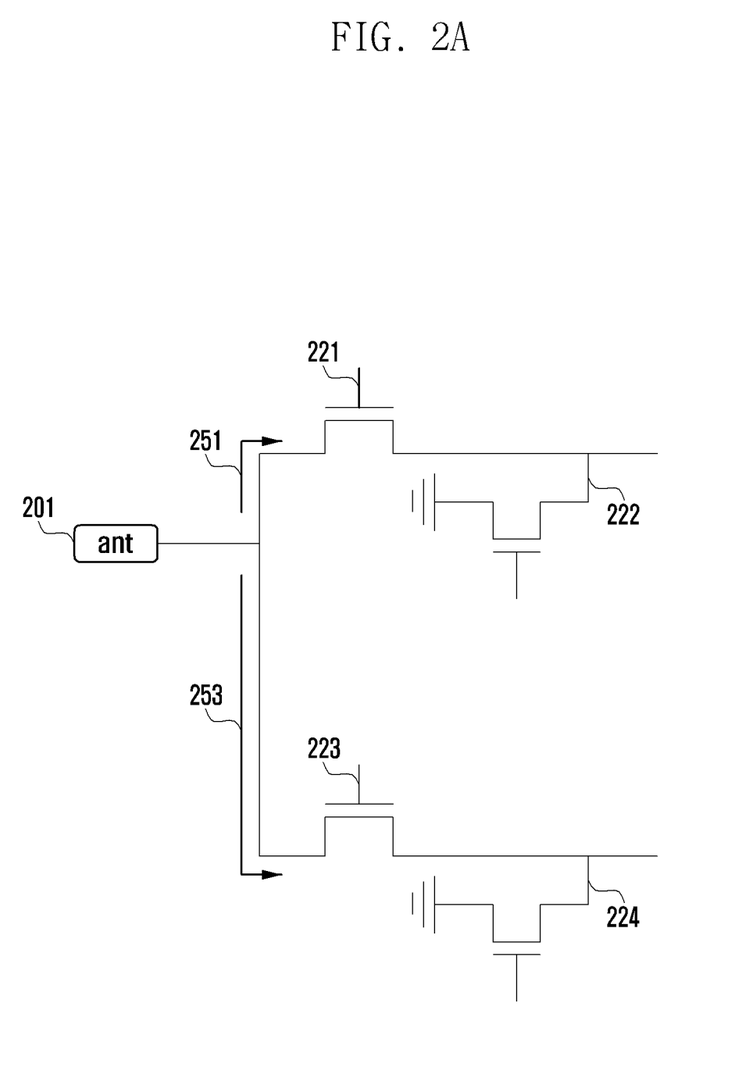
FIGS. 2A to 2C are circuit diagrams of transistor circuits according to an embodiment of the present disclosure.
Figure 2B:
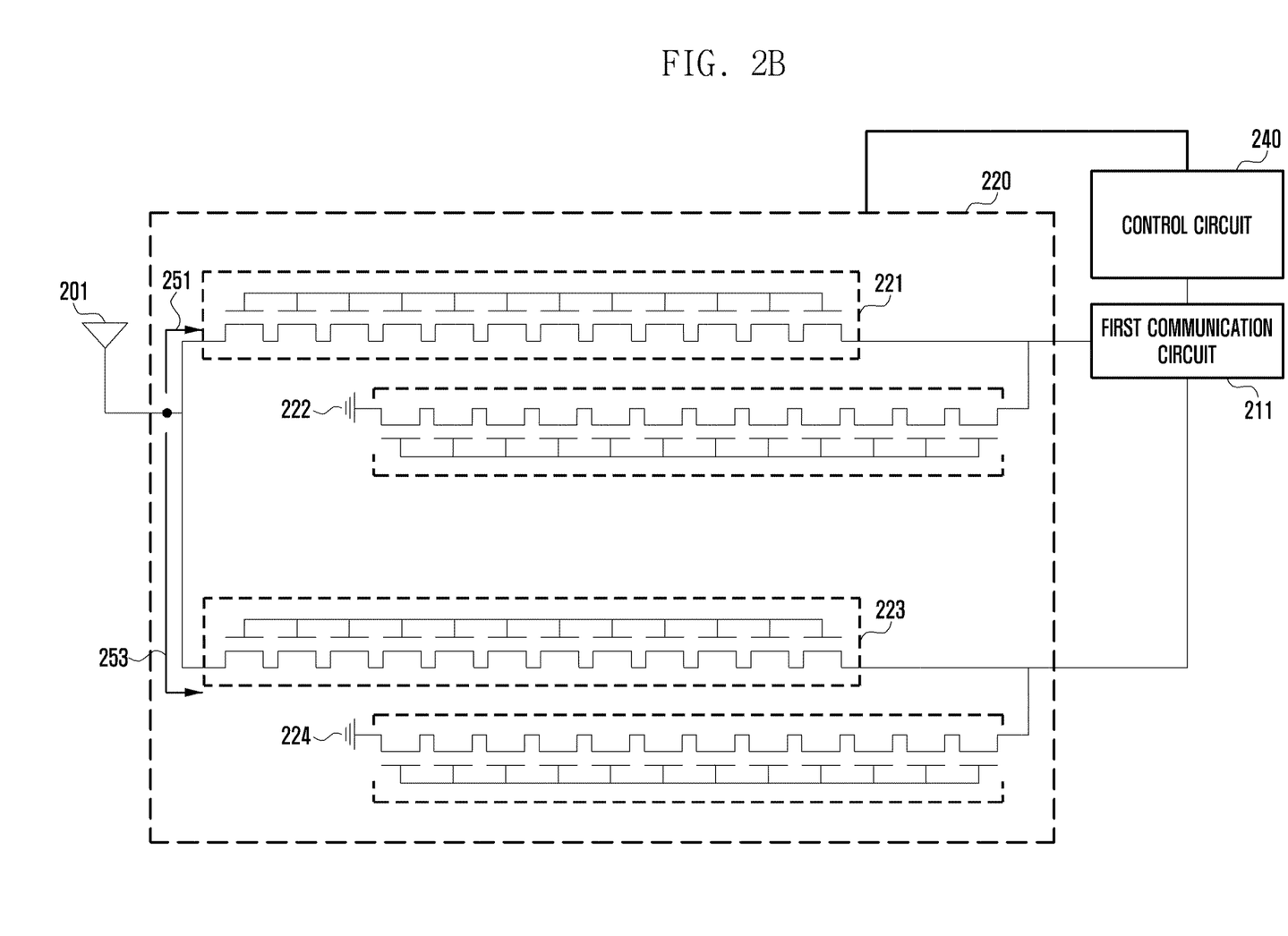
Figure 2C:
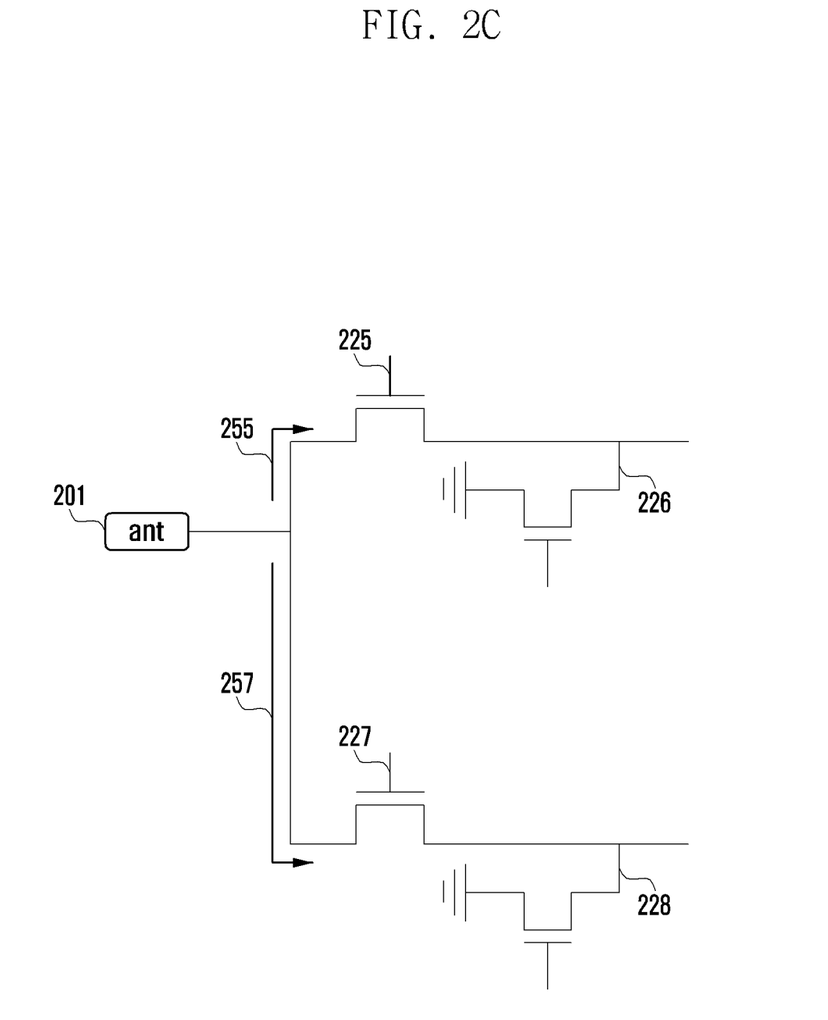

FIGS. 2A to 2C are circuit diagrams of transistor circuits according to an embodiment of the present disclosure.

FIGS. 2A and 2B illustrate a first transistor circuit 221 to a fourth transistor circuit 224 configured to receive a wireless signal of a TDD, and FIG. 2C illustrates a fifth transistor circuit 225 to an eighth transistor circuit 228 configured to receive a wireless signal of an FDD.

Referring to FIGS. 2A and 2B, a plurality of transistor circuits may be connected to an antenna 201 so that wireless signals having a plurality of frequency bands may be transmitted and received. As described above, the plurality of transistor circuits such as a first transistor circuit 221 to a fourth transistor circuit 224 may be connected to the antenna 201. The antenna 201 and the first transistor circuit 221 to the fourth transistor circuit 224 may be connected through a plurality of electrical paths. For example, the first transistor circuit 221 may be directly connected to the antenna 201 in series through a first path 251. The second transistor circuit 222 may be connected to the antenna 201 in parallel through the first path 251. The third transistor circuit 223 may be connected to the antenna 201 in series through a second path 253. The fourth transistor circuit 224 may be connected to the antenna 201 in parallel through the second path 253. The first transistor circuit 221 to the fourth transistor circuit 224 may each be configured with a plurality of transistors as shown in FIG. 2B. A transistor may include a field effect transistor (FET). Allowable powers may be assigned to a plurality of transistors, and the allowable power may be increased by configuring a transistor circuit with a plurality of transistors. However, if a sudden high power signal is induced, a plurality of transistors configuring a transistor circuit may break down because of antenna mismatching and the plurality of transistors may be overloaded beyond a voltage resistance limit.

For example, in the case of processing a signal with a conventional TDD, a control circuit 240 may switch on a transistor circuit (for example, the fourth transistor circuit 224) connected in parallel to the second path 253 corresponding to a receiver (Rx) of a TDD by excluding a transistor circuit (for example, the first transistor circuit 221) and the first path 251 corresponding to a transmitter (Tx) of the TDD from a plurality of paths (for example, the first path 251 corresponding to a Tx of the TDD and the second path 253 corresponding to an Rx of the TDD), and switch off a transistor circuit (for example, the third transistor circuit 223) connected in series to the second path 253 corresponding to an Rx of the TDD by excluding a transistor circuit (for example, the second transistor circuit 222) connected to the first path 251 corresponding to a Tx of the TDD and an electrical path corresponding to a Tx of the TDD.

According to switching on a transistor circuit (for example, the fourth transistor circuit 224) connected in parallel to the second path 253 corresponding to an Rx of the TDD by excluding an electrical path corresponding to a Tx of the TDD, if a sudden high power signal is induced and a plurality of transistors is overloaded beyond a voltage resistance limit, a transistor circuit (for example, the third transistor circuit 223) connected in series to the second path 253 corresponding to an Rx of the TDD may be controlled to switch on by excluding an electrical path corresponding to a Tx of the TDD. Accordingly, an antenna signal may be distorted or damaged.

Referring to FIG. 2C, a plurality of transistor circuits (for example, a fifth transistor circuit 225 to eighth transistor circuit 228) may be connected to an antenna 201. The antenna 201 and the fifth transistor circuit 225 to the eighth transistor circuit 228 may be connected through a plurality of electrical paths. For example, the fifth transistor circuit 225 may be connected to the antenna 201 in series through a third path 255. The sixth transistor circuit 226 may be connected to the antenna 201 in parallel through the third path 255. The seventh transistor circuit 227 may be connected to the antenna 201 in series through a fourth path 257. The eighth transistor circuit 228 may be connected to the antenna 201 in parallel through the fourth path 257.

If receiving a wireless signal of an FDD, a wireless signal having a corresponding frequency may be transmitted through an electrical path (for example, the third path 255 or the fourth path 257). For example, if the wireless signal is transmitted through the third path 255, the fifth transistor circuit 225 connected in series through the third path 255 and the eighth transistor circuit 228 connected in parallel through the fourth path 257 may be controlled to switch on, and the sixth transistor circuit 226 connected in parallel through the third path 255 and the seventh transistor circuit 227 connected in series through the fourth path 257 may be controlled to switch off.

The method for operating a switch according to receiving a wireless signal of an FDD may be applied identically to a conventional method for operating a switch according to receiving a wireless signal for a TDD.

In contrast to the conventional method, the control circuit 240 may not control transistor circuits connected in parallel where signals are not flowing because isolation between each electrical path (for example, the first path 251 and the second path 253) may be less important than that of an FDD if a method for processing a wireless signal utilizes a TDD.

By controlling to switch off a transistor circuit (for example, the fourth transistor circuit 224) connected in parallel to the second path 253 corresponding to a Tx of the TDD exclusively from electrical paths corresponding to an Rx of the TDD, transistor circuits (for example, the third transistor circuit 223) connected in series may be controlled not to switch on. Accordingly, an embodiment of the present disclosure may reduce power consumption in operations of switches by using a lesser number of transistors in a switch configuration of a TDD.

Figure 3:
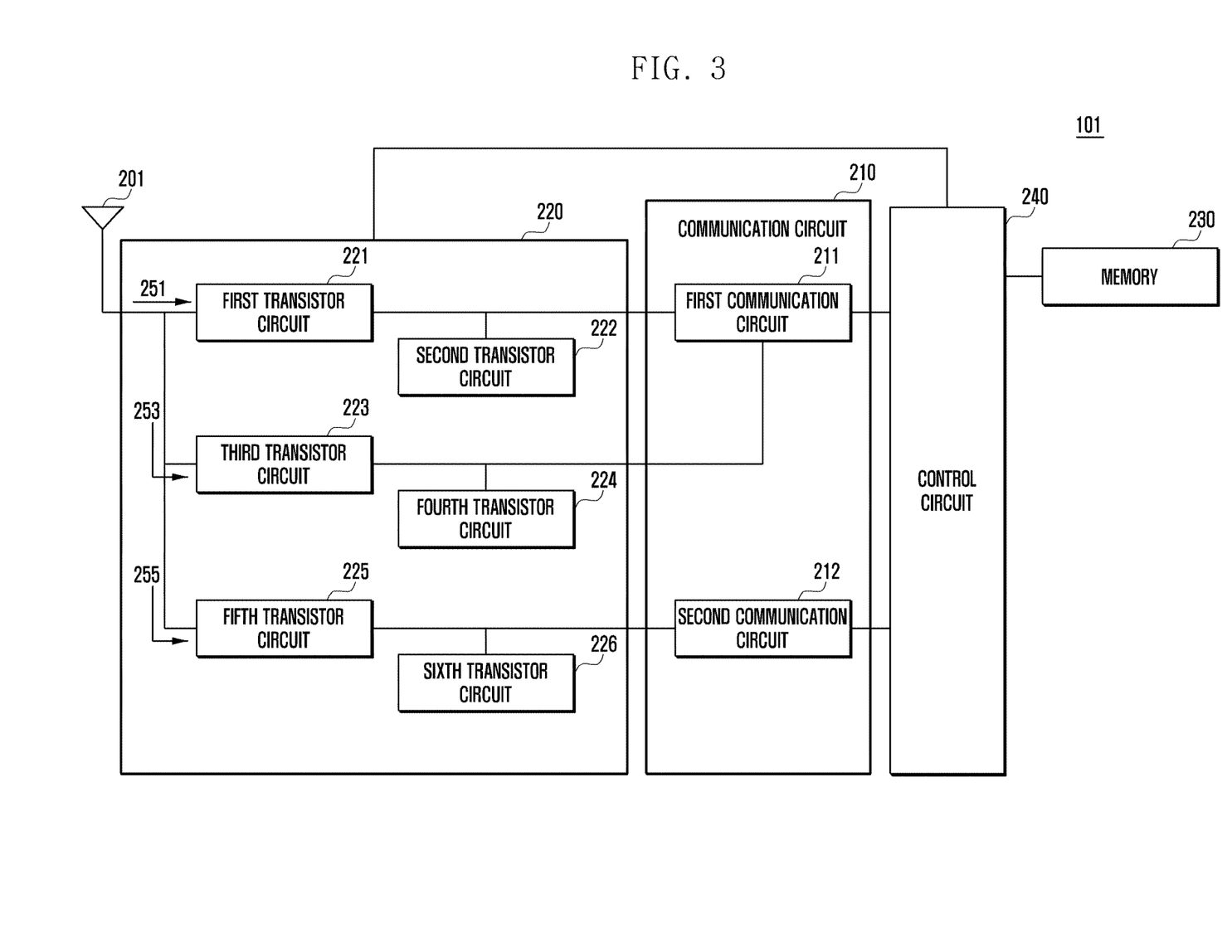
FIG. 3 is a block diagram of an electronic device according to an embodiment of the present disclosure.

FIG. 3 is a block diagram of an electronic device 101 according to an embodiment of the present disclosure.

Referring to FIG. 3, the electronic device 101 may include a communication circuit 210, a switch 220, a memory 230 (for example, memory 130), and a control circuit 240 (for example, processor 120).

The communication circuit 210 may establish communication between the electronic device 101 and an external electronic device. For example, the communication circuit 210 may communicate with an external device by connecting to a network through a wireless or wired communication. A wireless communication may include WiFi, BT, and NFC. Further, a wireless communication may include at least one of cellular communications such as LTE, LTE-A, CDMA, WCDMA, UMTS, WIBRO, GSM, circuit switched data (CSD), cellular digital packet data (CDPD), integrated digital enhanced network (iDEN), and personal digital cellular (PDC). The wired communication may include at least one of a USB, HDMI, RS-232, and POTS.

The communication circuit 210 may include a first communication circuit 211 and a second communication circuit 212.

The switch 220 may include a first transistor circuit 221 to a sixth transistor circuit 226.

The first communication circuit 211 may transmit a wireless signal having a first frequency band to a first path 251 and a second path 253 by connecting to the first transistor circuit 221 to the fourth transistor circuit 224. The second communication circuit 212 may transmit a wireless signal having a second frequency band to a third path 255 by connecting to a fifth transistor circuit 225 and a sixth transistor circuit 226. Namely, the first communication circuit 211 and the second communication circuit 212 may be communication modules transmitting wireless signals having frequency bands different from each other. For example, the first communication circuit 211 may be a mobile communication module for providing a GSM service and the second communication circuit 212 may be a mobile communication module for providing an LTE service.

The first transistor circuit 221 and the second transistor circuit 222 are connected in series and parallel, respectively, to the antenna 201 through the first path 251, the third transistor circuit 223 and the fourth transistor circuit 224 are connected to the antenna 201 in series and parallel, respectively, through the second path 253 by being located between the antenna 201 and the first communication circuit 211, and thereby electrical connections between the antenna 201 and the first communication circuit 211 may be switched on or off. The fifth transistor circuit 225 and the sixth transistor circuit 226 are connected to the antenna 201 in series and parallel, respectively, through the third path 255 by being located between the antenna 201 and the second communication circuit 212, and thereby electrical connections between the antenna 201 and the second communication circuit 212 may be switched on or off. As describe above, an embodiment of the present disclosure may have 2 communication circuits and 6 transistor circuits; however, other embodiments having different configurations may also be implemented.

The electronic device 101 may transmit or receive a wireless signal through the antenna 201 by using at least one of a TDD, an FDD, and a hybrid division duplexer (HDD) having both an FDD and a TDD. If a wireless signal is received for a TDD, the electronic device 101 controls to switch on a transistor circuit connected in series to an electrical path corresponding to a Tx of the TDD and to switch off transistor circuits connected in parallel to the Tx of the TDD, transistor circuits connected in series and parallel to an electrical path corresponding to an Rx of the TDD, and transistor circuits connected in series and parallel to an electrical path not corresponding to the TDD.

The memory 230 (for example, the memory 130 of FIG. 1) may include a program memory for storing operating programs of the electronic device 101 and a data memory for storing data generated while executing programs such as log information, contents, and objects.

The memory 230 may store a transistor control program for controlling the first transistor circuit 221 to the sixth transistor circuit 226 according to a wireless signal processing method.

The control circuit 240 (for example, the processor 120 of FIG. 1) may control general operations of the electronic device 101, signal flows between internal components of the electronic device 101, data processing, and power supplied to the components from a battery.

The control circuit 240 may control to switch on/off the first transistor circuit 221 to the sixth transistor circuit 226 by using a transistor control program stored in the memory 230 and to transmit or receive a wireless signal through the first communication circuit 211 or the second communication circuit 212.

Transistor circuits (for example, the first transistor circuit 221 to the sixth transistor circuit 226) may be connected to the antenna 201. The first transistor circuit 221 may be connected to the antenna 201 in series through the first path 251 and the second transistor circuit 222 may be connected to the antenna 201 in parallel through the first path 251. The third transistor circuit 223 may be connected to the antenna 201 in series through the second path 253 and the fourth transistor circuit 224 may be connected to the antenna 201 in parallel through the second path 253. The fifth transistor circuit 225 may be connected to the antenna 201 in series through the third path 255 and the sixth transistor circuit 226 may be connected to the antenna 201 in parallel through the third path 255.

The control circuit 240 may control to switch on/off transistor circuits connected in series and parallel to an electrical path corresponding to a received wireless signal among a plurality of electrical paths connecting the antenna 201 to the first communication circuit 211 or the second communication circuit 212.

In a TDD, a switch terminal is configured with a Tx and an Rx, and the Tx and the Rx may switch between a transmission mode and a reception mode so that a wireless signal may be transmitted or received at a certain point in time. In the TDD, isolation between each section (for example, the first path 251 corresponding to a Tx of the TDD and the second path 253 corresponding to an Rx of a TDD) may be less important than for an FDD sharing a frequency. Accordingly, if a received wireless signal corresponds to a TDD, the control circuit 240 may control to switch off an electrical path corresponding to a TDD (for example, transistor circuits connected in series and parallel to an electrical path excluding a Tx of the TDD) among a plurality of electrical paths.

Hereinafter, an of the present disclosure may transmit a signal to the first path 251 if a signal received from the antenna 201 corresponds to a TDD and to transmit a signal to the third path 255 if a signal received from the antenna 201 corresponds to an FDD.

Various embodiments of the present disclosure are described below in more detail with reference to FIG. 4.

Figure 4:
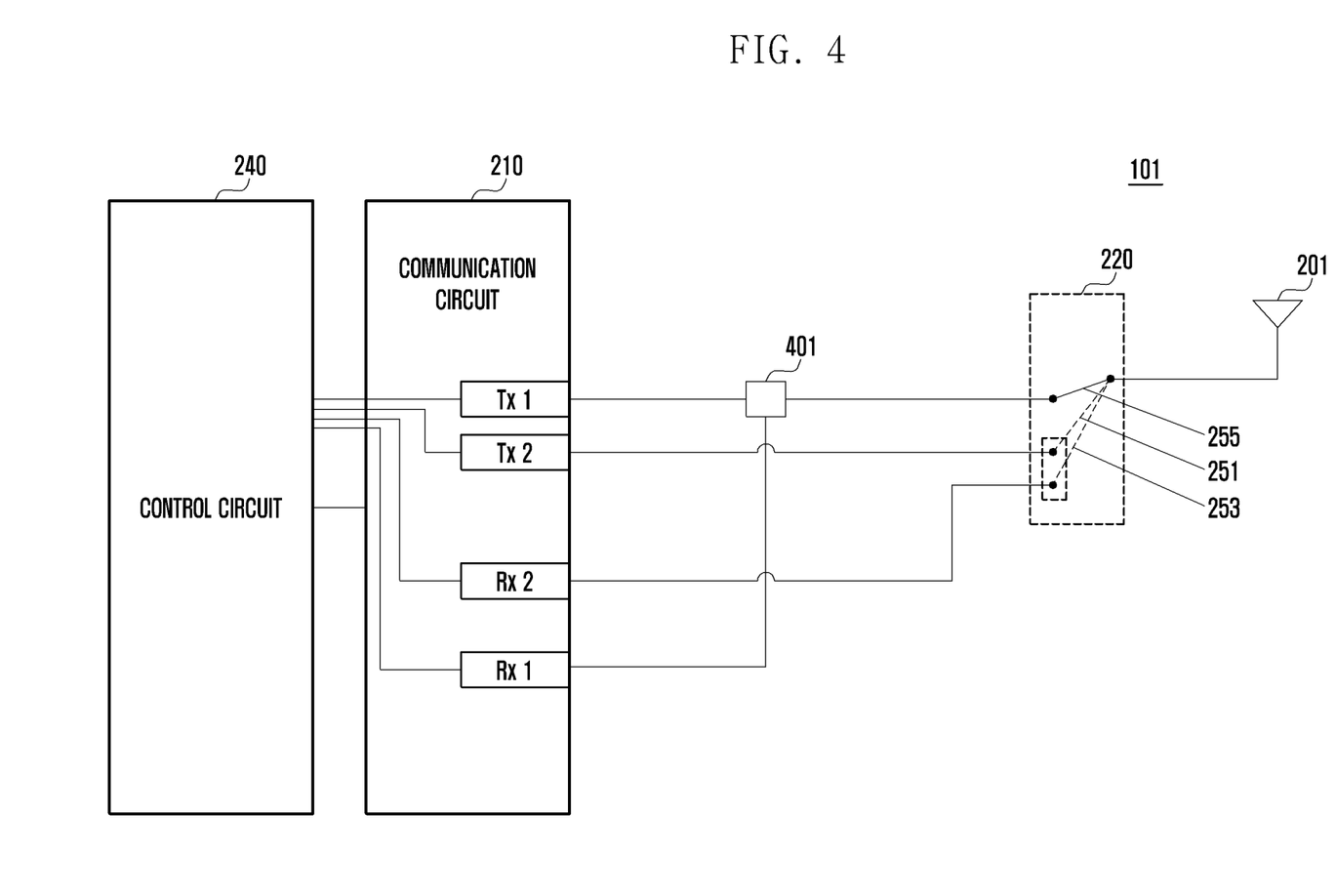
FIG. 4 is a block diagram of an electronic device for operating a switch according to an embodiment of the present disclosure.

FIG. 4 is a block diagram of an electronic device 101 for operating a switch according to an embodiment of the present disclosure.

Referring to FIG. 4, if a received signal corresponds to a TDD, the control circuit 240 may control to connect a transmitter Tx2 to the first path 251 corresponding to a Tx of the TDD. Pulse amplitude modulation (PAM) may be further included in the first path 251 to amplify a wireless signal. The control circuit 240 may control to connect a receiver Rx2 through the second path 253 a wireless signal is received at a certain point in time. A low noise amplifier (LNA) may be further included in the second path 253 to minimize the noise of a wireless signal.

With reference to FIG. 3, the control circuit 240 may control to switch on the first transistor circuit 221 connected in series to the first path 251 and to switch off the second transistor circuit 222 connected in parallel to the first path 251.

In a conventional method, the control circuit 240 controls to switch off the third transistor circuit 223 connected in series to the second path 253 corresponding to an Rx of a TDD and to switch on the fourth transistor circuit 224 connected in parallel to the second path 253 according to a signal transmitted through the first path 251. The control circuit 240 controls to switch off a transistor circuit (for example, the fifth transistor circuit 225) connected in series to an electrical path (for example, the third path 255) by excluding electrical paths corresponding to a TDD and to switch on the sixth transistor circuit 226 connected in parallel to the third path 255.

In an embodiment of the present disclosure, the control circuit 240 may control to switch off the fourth transistor circuit 224 connected in parallel to the second path 253 corresponding to an Rx of a TDD. The control circuit 240 may control to switch off a transistor circuit (for example, the sixth transistor circuit 226) connected in parallel to an electrical path (for example, the third path 255) by excluding electrical paths corresponding to a TDD.

As shown in FIG. 4, if a wireless signal received from the antenna 201 corresponds to an FDD, the control circuit 240 may transmit the wireless signal through the third path 255. In the case of an FDD, a transmission/reception divider (for example, a duplexer 401) may be included to divide a wireless signal into a reception signal and a transmission signal. In the case of an FDD, a wireless signal may be transmitted to a transmitter Tx1 or received from a receiver Rx1 through the duplexer 401.

With reference to FIG. 3, if a received wireless signal corresponds to an FDD, the control circuit 240 may control to switch on a transistor circuit (for example, the fifth transistor circuit 225) connected in series to an electrical path (for example, the third path 255) corresponding to an FDD and to switch off a transistor circuit (for example, the sixth transistor circuit 226) connected to an electrical path (for example, the third path 255) corresponding to an FDD among a plurality of electrical paths. Among the plurality of electrical paths, the control circuit 240 may control to switch off transistor circuits (for example, the first transistor circuit 221 and the third transistor circuit 223) connected in series to each electrical path (for example, the first path 251 and the second path 253) by excluding electrical paths corresponding to an FDD and to switch on transistor circuits (for example, the second transistor circuit 222 and the fourth transistor circuit 224) connected in parallel to each electrical path.

The electronic device 101 according to an embodiment of the present disclosure may include a housing, a communication circuit 210 disposed in the housing and configured to generate a signal for a TDD and/or an FDD, an antenna 201 electrically connected to the communication circuit 210, a plurality of electrical paths for connecting the communication circuit 210 and the antenna 201, and a control circuit 240 electrically connected to the communication circuit 210, the antenna 201, and the plurality of electrical paths. Each of the plurality of electrical paths may include first transistors connected in series to each electrical path and second transistors electrically connected between a ground and each electrical path. The control circuit 240 may control to receive a wireless signal, to select one of a TDD and an FDD to transmit the received wireless signal, and to selectively activate a first transistor and a second transistor disposed in at least one electrical path among the plurality of electrical paths and first and second transistors disposed in at least another electrical path among the plurality of electrical paths based on the selection.

In an embodiment of the present disclosure, if the selection is made for a TDD, the control circuit 240 may control to activate a first transistor disposed in a first electrical path among the plurality of electrical paths and to deactivate a second transistor disposed in the first electrical path and first and second transistors disposed in other electrical paths among the plurality of electrical paths.

In an embodiment of the present disclosure, if the selection is made for an FDD, the control circuit 240 may control to activate a first transistor disposed in a first electrical path and second transistors disposed in other electrical paths among the plurality of electrical paths and to deactivate a second transistor disposed in the first electrical path and first transistors disposed in other electrical paths among the plurality of electrical paths.

In an embodiment of the present disclosure, the control circuit 240 may detect at least one signal from the surroundings of the electronic device 101 by using the communication circuit 210 and select at least one of a TDD and an FDD based on the detected signal.

In an embodiment of the present disclosure, the control circuit 240 may be disposed in an integrated circuit identical to the communication circuit 210.

In an embodiment of the present disclosure, the first transistor and/or the second transistor may include a plurality of transistors connected to each other in parallel.

In an embodiment of the present disclosure, a second transistor of the first electrical path and second transistors of other electrical paths among the plurality of electrical paths may further include a logic circuit.

In an embodiment of the present disclosure, the control circuit 240 may control to deactivate the second transistor of the first electrical path and second transistors of other electrical paths among the plurality of electrical paths by using a logic circuit.

In an embodiment of the present disclosure, the second transistor of the first electrical path and second transistors of other electrical paths among the plurality of electrical paths may further include a direct current (DC) blocking capacitor.

In an embodiment of the present disclosure, the control circuit 240 may deactivate the second transistor of the first electrical path and second transistors of other electrical paths among the plurality of electrical paths by using a DC blocking capacitor.

In an embodiment of the present disclosure, the electronic device 101 may further include a memory 230 configured to store states of the first and second transistors connected to the plurality of electrical paths according to a TDD or an FDD in order to transmit a received wireless signal.

In an embodiment of the present disclosure, if a decision is made for a TDD in the case of an HDD using both the TDD and an FDD, the control circuit 240 may activate a first transistor of an electrical path corresponding to the TDD among the plurality of electrical paths and deactivate a second transistor of the electrical path corresponding to the TDD and first and second transistors of the electronic path corresponding to the FDD among the plurality of electrical paths.

The electronic device 101 may include selective components having additional functions such as a GPS module for receiving location information, an infrared sensor module, an illumination sensor module, a camera module for taking an image or a video, and a broadcasting reception module.

FIGS. 2 to 4 illustrate various embodiments of the present disclosure which include electrical paths (for example, a first path 251 and a second path 253) of a TDD and electrical paths (for example, a third path 255) of an FDD; however, a greater number of paths may be utilized.

A method for operating a switch by using both a TDD and an FDD shown in FIGS. 3 and 4 is described below in greater detail with reference to FIGS. 5 and 6.

Figure 5:
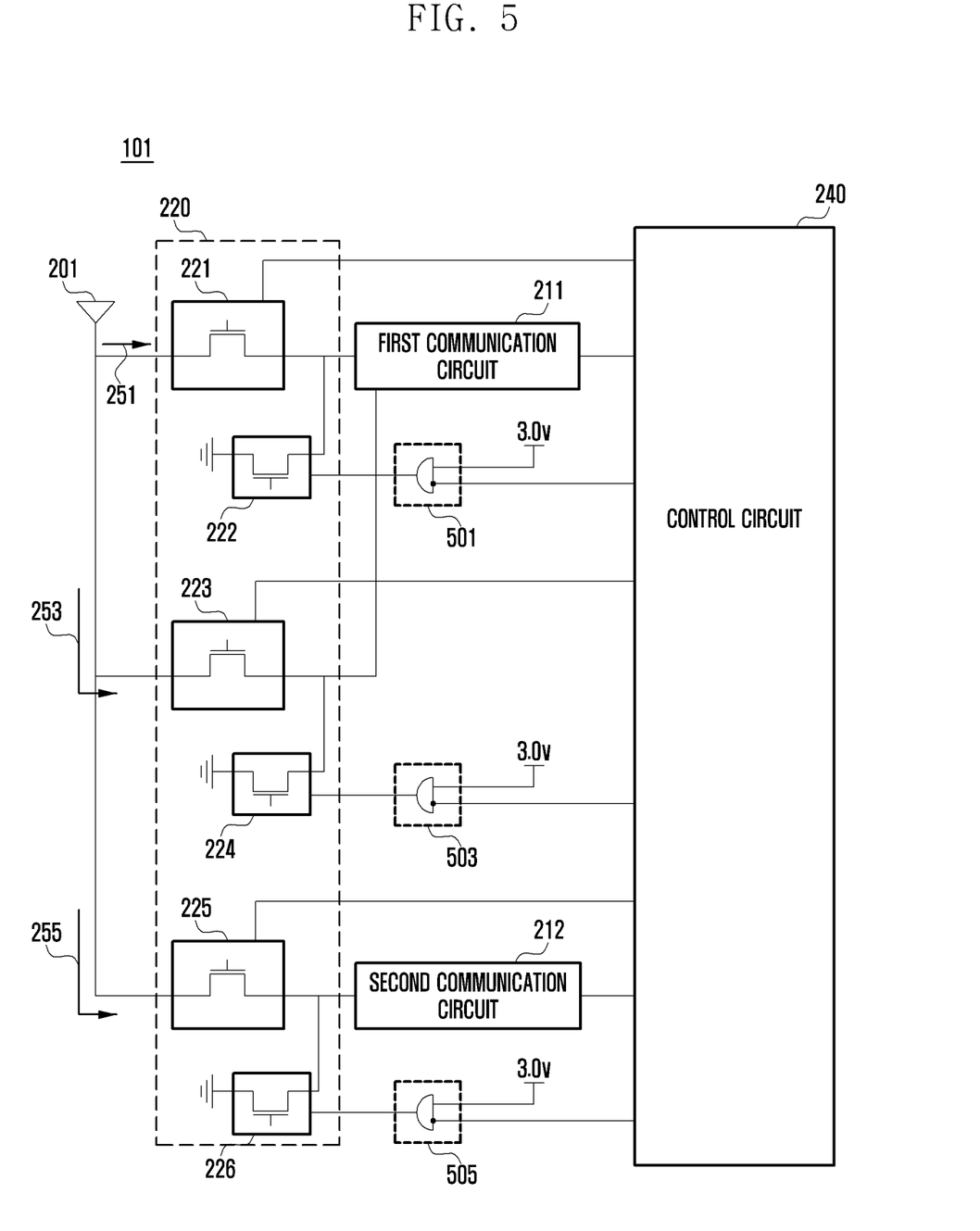
FIG. 5 is a block diagram of an electronic device for operating a switch according to an embodiment of the present disclosure.

FIG. 5 is a block diagram of an electronic device 101 for operating a switch according to an embodiment of the present disclosure.

FIG. 5 is a drawing for describing a method for operating a switch 220 by using logic gates 501 to 505.

Referring to FIG. 5, the control circuit 240 may receive a wireless signal. The control circuit 240 may receive and transmit the wireless signal through a corresponding electrical path.

According to an embodiment of the present disclosure, the electronic device 101 may transmit a wireless signal through a first path 251 and a second path 253 if the wireless signal received from an antenna 201 corresponds to a TDD.

If a wireless signal received from the antenna 201 corresponds to a TDD, the control circuit 240 may control to switch on a first transistor circuit 221 connected in series to the first path 251 by transmitting the wireless signal through the first path 251 corresponding to a Tx of the TDD and switch off transistor circuits (for example, a second transistor circuit 222 and a fourth transistor circuit 224) connected in parallel to the first path 251 and the second path 253 by using the logic gates 501 to 503.

If a wireless signal received from the antenna 201 corresponds to a TDD and the wireless signal is transmitted through the first path 251, the control circuit 240 may control to switch off a fifth transistor circuit 225 connected in series to a third path 255 corresponding to an FDD. Further, if the wireless signal corresponds to the TDD, the control circuit 240 may control to switch off a sixth transistor circuit 226 connected in parallel to the third path 255 by using the logic gate 505. Accordingly, breakdowns of transistors may be avoided by dividing a voltage generated from a reflected wave into transistors connected in series and transistors connected in parallel to a ground (GND).

The electronic device 101 may control transistors by using a logic circuit. For example, if a wireless signal is transmitted or received through the first path 251, the control circuit 240 may control to switch on the first transistor circuit 221 of the first path 251 and transistor circuits of other paths (for example, the fourth transistor circuit 224 connected in parallel to the second path 253 and the sixth transistor circuit 226 connected in parallel to the third path 255). If the TDD operates, the control circuit 240 may switch off the second transistor circuit 222, the fourth transistor circuit 224, and the sixth transistor circuit 226 through the logic gates 501-505.

The control circuit 240 may control to switch off the fourth transistor circuit 224 and the sixth transistor circuit 226 by using a DC blocking capacitor that shuts off an electrical current to the transistor circuits. In this case, a voltage resistance limit may be improved by dividing the voltage into the number of transistors disposed in a transistor circuit connected in series to the antenna 201 and the number of transistors disposed in a transistor circuit connected in parallel to the antenna 201. Namely, the voltage resistance may be doubled by dividing the voltage into the number of transistors disposed in a transistor circuit connected in series to the antenna 201 and the number of transistors disposed in a transistor circuit connected in parallel to the antenna 201.

Further, only the third transistor circuit 223 may be disposed in the second path 253 by omitting the fourth transistor circuit 224.

Figure 6:
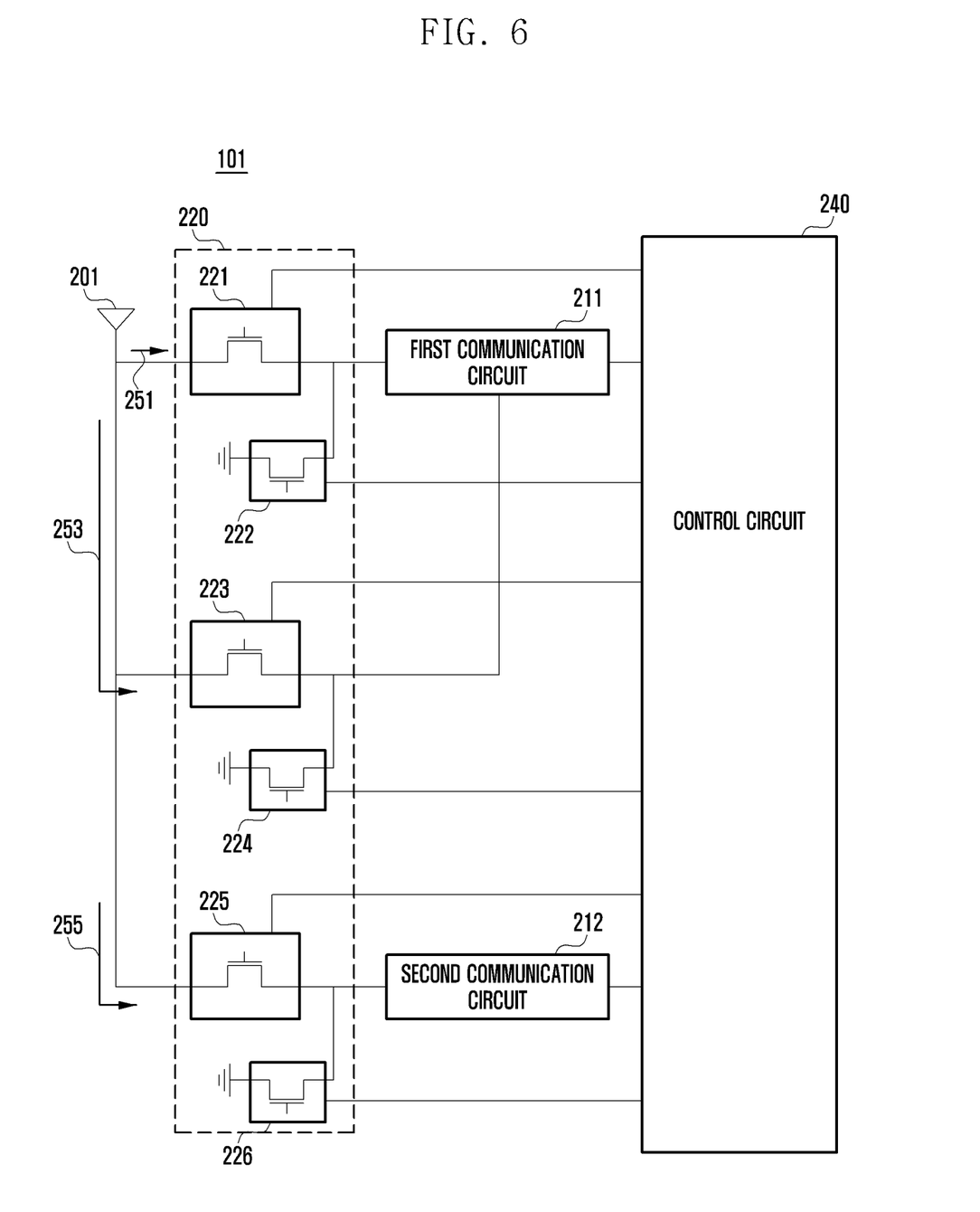
FIG. 6 is a block diagram of an electronic device for operating a switch according to an embodiment of the present disclosure.

FIG. 6 is a block diagram of an electronic device 101 for operating a switch according to an embodiment of the present disclosure.

Referring to FIG. 6, an embodiment of the present disclosure is illustrated for controlling to switch off a fourth transistor circuit 224 and a sixth transistor circuit 226 connected in parallel to a second path 253 and a third path 255, if a signal received from the antenna 201 shown in FIG. 5 corresponds to a TDD.

The following Table 1 shows an example where a first path 251 and a second path 253 correspond to a TDD and a third path 255 corresponds to an FDD.

TABLE 1

|  | Conventional method | Present disclosure |
|---|---|---|
| First transistor circuit 221 | on | on |
| Second transistor circuit 222 | off | off |
| Third transistor circuit 223 | off | off |
| Fourth transistor circuit 224 | on | off |
| Fifth transistor circuit 225 | off | off |
| Sixth transistor circuit 226 | on | off |

If a received wireless signal corresponds to the TDD, the control circuit 240 may control to switch on a first transistor circuit 221 connected in series to a first path 251 corresponding to a Tx of the TDD.

In a conventional method, if a received wireless signal corresponds to a TDD, the control circuit 240 may control to switch off electrical paths (for example, a third transistor circuit 223 connected in series to a second path 253 corresponding to an Rx of the TDD and a fifth transistor circuit 225 connected in series to a third path 255) by excluding the first path 251 corresponding to the Tx of the TDD and to switch on a fourth transistor circuit 224 connected in parallel to the second path 253 and a sixth transistor circuit 226 connected in parallel to the third path 255. For example, in a state where the fourth transistor circuit 224 is connected in parallel to the second path 253, a transmitting signal may be prevented from flowing to the first path 251 corresponding to the Tx of the TDD. However, if a sudden high power signal flows, problems may be generated by a plurality of transistors configuring a transistor circuit breaking down because of antenna mismatching. Namely, if the intensity of a signal exceeds a voltage resistance limit that transistors can withstand, antenna signals may be distorted or damaged because of a sudden voltage change. For example, if a predetermined allowable electrical power is 14.1 V (12× 1.175 V) and a voltage of 17.8 V, which is greater than the allowable voltage of 14.1 V (12×1.175 V), is provided to transistor circuits because of antenna mismatching, problems in switching on the third transistor circuit 223 and the fifth transistor circuit 225 may be generated because of a counter-flow of the signal, even though electrical paths excluding the electrical path corresponding to the Tx of the TDD (for example, a second path 253 corresponding to an Rx of the TDD and the third transistor circuit 223 and a fifth transistor circuit 225 connected in series to a third path 255 corresponding to an FDD) remain in a switched off state.

In an embodiment of the present disclosure, if a received wireless signal corresponds to a TDD, the control circuit 240 may control to switch off a fourth transistor circuit 224 and a sixth transistor circuit 226 connected in parallel to the second path 253 and the third path 255 if the signal is transmitted to the first path 251.

By controlling to switch off the fourth transistor circuit 224 and the sixth transistor circuit 226, the number of transistors disposed in a transistor circuit connected in series to an antenna 201 and the number of transistors disposed in a transistor circuit connected in parallel to the antenna 201 share the voltage, and thereby the voltage resistance limit may be improved.

If a wireless signal (for example, a GSM wireless signal) is processed by a TDD, the control circuit 240 may control not to switch on transistor circuits connected in series by controlling transistor circuits connected in parallel by excluding an electrical path transmitting a wireless signal of the TDD. Accordingly, an embodiment of the present disclosure may provide benefits in the sense of economy and installation because power consumption, material costs, and component size may be reduced by using a lower number of transistors.

Figure 7:
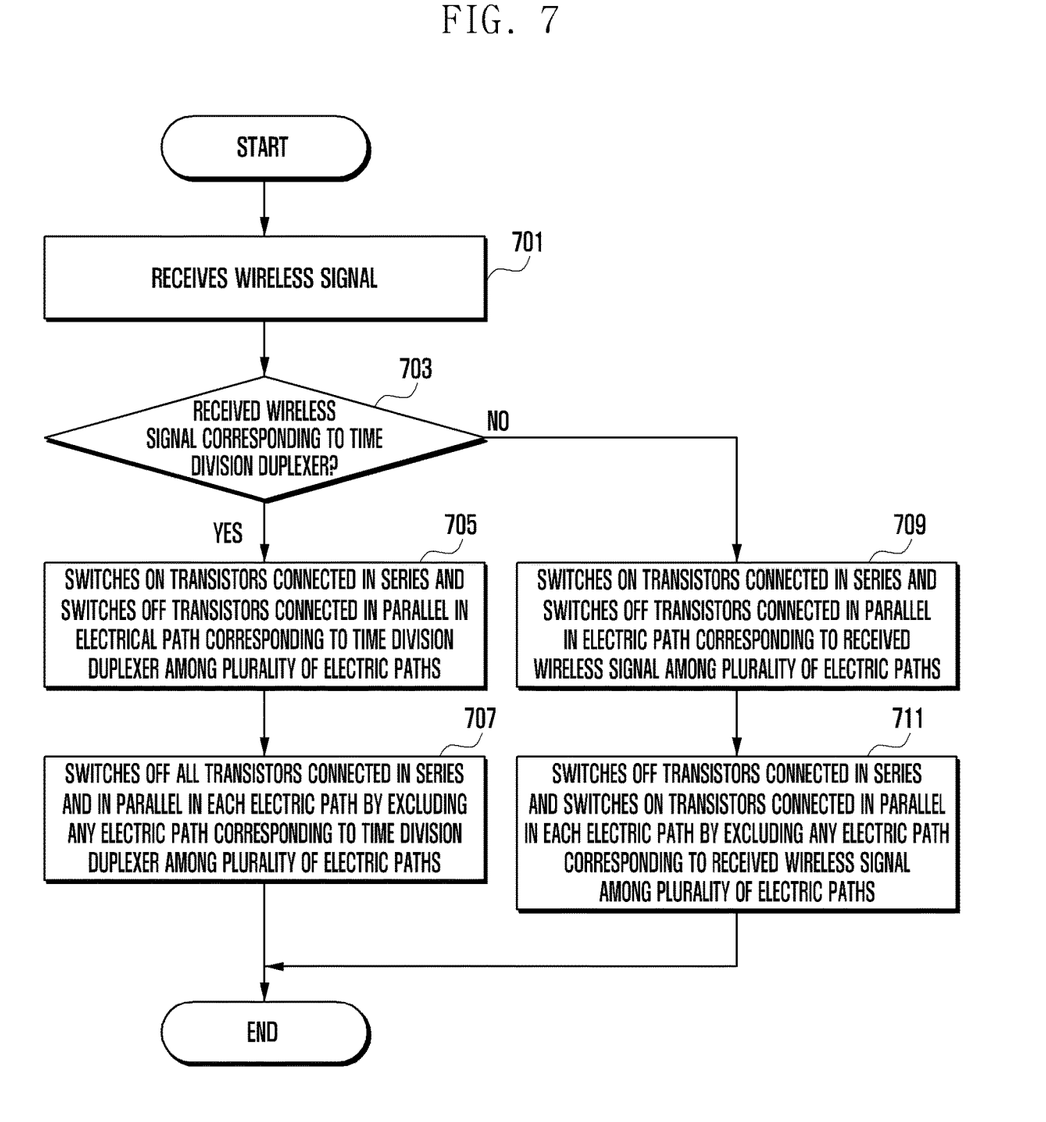
FIG. 7 is a flowchart of a method for operating a switch according to an embodiment of the present disclosure.

FIG. 7 is a flowchart of a method for operating a switch according to an embodiment of the present disclosure.

An antenna 201 may be electrically connected to a first communication circuit 211 or a second communication circuit 212 through a plurality of electrical paths. A control circuit 240 may transmit or receive a wireless signal through the plurality of electrical paths.

Referring to FIG. 7, the control circuit 240 receives a wireless signal at operation 701. The wireless signal may be received by using one of an FDD and a TDD.

The control circuit 240 identifies whether the received wireless signal corresponds to the TDD at operation 703.

If the received wireless signal corresponds to the TDD, the control circuit 240 controls to switch on transistors connected in series to an electrical path corresponding to a Tx of the TDD among a plurality of electrical paths and to switch off transistors connected in parallel to the electrical path corresponding to the Tx of the TDD at operation 705.

The control circuit 240 controls to switch off transistors connected in series and parallel to each electrical path by excluding the electrical path corresponding to the Tx of the TDD among the plurality of paths at operation 707.

If the wireless signal received at operation 703 does not correspond to the TDD, the control circuit 240 controls to switch on transistors connected in series to the electrical path corresponding to the received wireless signal among the plurality of electrical paths and to switch off transistors connected in parallel to the electrical path corresponding to the received wireless signal at operation 709.

The control circuit 240 controls to switch off transistors connected in series to each electrical path by excluding the electrical path corresponding to the received wireless signal from a plurality of paths and to switch off transistors connected in parallel to each electrical path at operation 711.

A method for operating a switch according to an embodiment of the present disclosure may include operations of receiving a wireless signal, selecting one of a TDD and an FDD to transmit the received wireless signal, and selectively activating a first transistor and a second transistor disposed in at least one electrical path and first and second transistors disposed in at least another electrical path among a plurality of electrical paths based on the selection.

In an embodiment of the present disclosure, the operation of selectively activating a first transistor and a second transistor disposed in at least one electrical path and first and second transistors disposed in at least another electrical path among a plurality of electrical paths based on the selection may include, if the selection is made for a TDD, activating a first transistor disposed in a first electrical path among the plurality of electrical paths and deactivating a second transistor disposed in the first electrical path and first and second transistors disposed in other electrical paths among the plurality of electrical paths.

In an embodiment of the present disclosure, the operation of selectively activating a first transistor and a second transistor disposed in at least one electrical path and first and second transistors disposed in at least another electrical path among a plurality of electrical paths based on the selection may include, if the selection is made for an FDD, activating a first transistor disposed in a first electrical path and second transistors disposed in other electrical paths among the plurality of electrical paths and deactivating a second transistor disposed in the first electrical path and first transistors disposed in other electrical paths among the plurality of electrical paths.

In an embodiment of the present disclosure, an operation of detecting at least one signal from surroundings of an electronic device by using a communication circuit and an operation of selecting one of a TDD and an FDD based on the detected signal may be further included.

In an embodiment of the present disclosure, a first transistor and/or a second transistor may include a plurality of transistors connected in parallel, and an operation of selectively activating the first transistor and the second transistor disposed in at least one electrical path and first and second transistors disposed in at least another electrical path among a plurality of electrical paths based on the selection is performed by selectively activating first and second transistors including a plurality of transistors connected in parallel in at least one electrical path and first and second transistors including a plurality of transistors connected in parallel in at least another electrical path among the plurality of electrical paths.

In an embodiment of the present disclosure, if a selection is made for a TDD, an operation of selectively activating a first transistor and a second transistor disposed in at least one electrical path and first and second transistors disposed in at least another electrical path among a plurality of electrical paths based on the selection deactivates the second transistor disposed in the first electrical path and second transistors disposed in other electrical paths among the plurality of electrical paths by using logic circuits installed in the second transistor of the first electrical path and the second transistors of other electrical paths among the plurality of electrical paths.

In an embodiment of the present disclosure, if a selection is made for a TDD, an operation of selectively activating a first transistor and a second transistor disposed in at least one electrical path and first and second transistors disposed in at least another electrical path among a plurality of electrical paths based on the selection deactivates the second transistor disposed in the first electrical path and second transistors disposed in other electrical paths among the plurality of electrical paths by using DC blocking capacitors installed in the second transistor of the first electrical path and the second transistors of other electrical paths among the plurality of electrical paths.

In an embodiment of the present disclosure, if a selection is made for a TDD in the case of an HDD using both the TDD and an FDD, an operation of selectively activating a first transistor and a second transistor disposed in at least one electrical path and first and second transistors disposed in at least another electrical path among a plurality of electrical paths based on the selection activates the first transistor disposed in an electrical path corresponding to the TDD among the plurality of electrical paths and deactivates the second transistor disposed in the electrical path corresponding to the TDD and first and second transistors disposed in an electrical path corresponding to the FDD among the plurality of electrical paths.

A method for operating a switch and an electronic device supporting the same according to an embodiment of the present disclosure may avoid switching on transistors connected in series by controlling to switch off transistors connected in parallel in electrical paths other than an electrical path corresponding to a TDD. Accordingly, an embodiment of the present disclosure may reduce power consumption by using a lower number of transistors in the method for operating a switch. Further, an embodiment of the present disclosure may provide benefits in the sense of economy and installation because material costs may be reduced and components may be configured in a smaller size by using a lower number of transistors.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. An electronic device, comprising:
   a housing;
   a communication circuit disposed in the housing;
   an antenna electrically connected with the communication circuit;
   a plurality of electrical paths configured to connect the communication circuit and the antenna; and
   a control circuit configured to connect with the communication circuit, the antenna, and the plurality of electrical paths,
   wherein each electrical path included in the plurality of electrical paths comprises:
      a series transistor configured to connect with each electrical path in series, and
      a parallel transistor configured to connect with each electrical path in parallel and a ground,
   wherein the control circuit is configured to:
      receive a wireless signal,
      select one of a time division duplexer (TDD) and a frequency division duplexer (FDD) based on the received wireless signal, and
      selectively activate the series transistor and the parallel transistor disposed in each electrical path based on the selection, and
   wherein, if the selection is made for the TDD, the control circuit is further configured to:
      determine at least one electrical path corresponding to the TDD among the plurality of electrical paths,
      activate a first set of transistors including the series transistor disposed in series with a first electrical path among the determined at least one electrical path corresponding to the TDD,
      deactivate a second set of transistors including the parallel transistor disposed in parallel with the first electrical path among the determined at least one electrical path corresponding to the TDD,
      deactivate the first set of transistors including each series transistor disposed in series with electrical paths excluding the first electrical path among the plurality of electrical paths,
      deactivate the second set of transistors including each parallel transistor disposed in parallel with the electrical paths excluding the first electrical path among the plurality of electrical paths,
detect at least one signal from surroundings of the electronic device by using the communication circuit, and
select at least one of the TDD and the FDD based on the detected signal.

2. The electronic device of claim 1, wherein, if the selection is made for the FDD, the control circuit is further configured to:
activate the series transistor disposed in series with the first electrical path among the plurality of electrical paths,
activate the parallel transistors disposed in parallel with the electrical paths excluding the first electrical path among the plurality of electrical paths,
deactivate the parallel transistor disposed in parallel with the first electrical path, and
deactivate the series transistors disposed in series with the electrical paths excluding the first electrical path among the plurality of electrical paths.

3. The electronic device of claim 1, wherein the control circuit is disposed in an integrated circuit identical to the communication circuit.

4. The electronic device of claim 1, further comprising:
a logic circuit installed in the parallel transistor of each of the plurality of electrical paths.

5. The electronic device of claim 4, wherein the control circuit is further configured to deactivate the parallel transistor of each of the plurality of electrical paths by using the logic circuit.

6. The electronic device of claim 1, wherein a direct current (DC) blocking capacitor is installed in the parallel transistor of each of the plurality of electrical paths.

7. The electronic device of claim 6, wherein the control circuit is further configured to deactivate the parallel transistor of each of the plurality of electrical paths by using the DC blocking capacitor.

8. The electronic device of claim 1, further comprising:
a memory configured to store states of the series transistor and the parallel transistor connected to each of the plurality of electrical paths according to the TDD and the FDD in order to transmit a received wireless signal.

9. The electronic device of claim 1, wherein, if a decision is made for the TDD in a case of a hybrid division duplexer (HDD) using both the TDD and the FDD, the series transistor of the first electrical path corresponding to the TDD among the plurality of electrical paths is activated, and the parallel transistor of the first electrical path corresponding to the TDD and series and parallel transistors of the electronic paths excluding the first electrical path among the plurality of electrical paths are deactivated.

10. A method for operating a switch, the method comprising:
receiving a wireless signal;
selecting one of a time division duplexer (TDD) and a frequency division duplexer (FDD) based on the received wireless signal;
selectively activating a series transistor and a parallel transistor disposed in each electrical path of a plurality of electrical paths based on the selection;
detecting at least one signal from surroundings of the electronic device by using a communication circuit; and
selecting one of the TDD and the FDD based on the detected signal,
wherein if the selection is made for the TDD, determine at least one electrical path corresponding to the TDD among the plurality of electrical paths, activating a first set of transistors including the series transistor disposed in series with a first electrical path among the determined at least one electrical path corresponding to the TDD, deactivating a second set of transistors including the parallel transistor disposed in parallel with the first electrical path among the determined at least one electrical path corresponding to the TDD, deactivate the first set of transistors including each series transistor disposed in series with electrical paths excluding the first electrical path among the plurality of electrical paths, and deactivate the second set of transistors including each parallel transistor disposed in parallel with the electrical paths excluding the first electrical path among the plurality of electrical paths.

11. The method of claim 10, wherein selectively activating the series transistor and the parallel transistor disposed in each electrical path comprises:
if the selection is made for the FDD,
activating the series transistor disposed in series with the first electrical path among the plurality of electrical paths, activating the parallel transistors disposed in parallel with the electrical paths excluding the first electrical path among the plurality of electrical paths, deactivating the parallel transistor disposed in parallel with the first electrical path, and deactivating the series transistors disposed in series with the electrical paths excluding the first electrical path among the plurality of electrical paths.

12. The method of claim 10, wherein, if the selection is made for the TDD,
deactivating the parallel transistor disposed in each of the plurality of electrical paths by using logic circuits installed in the parallel transistor of each of the plurality of electrical paths.

13. The method of claim 10, wherein, if the selection is made for the TDD,
deactivating the parallel transistor disposed in each of the plurality of electrical paths by using direct current (DC) blocking capacitors installed in the parallel transistor of each of the plurality of electrical paths.

14. The method of claim 10, wherein, if the selection is made for the TDD in a case of a hybrid division duplexer (HDD) using both the TDD and the FDD, activating the series transistor of the first electrical path corresponding to the TDD among the plurality of electrical paths, and deactivating the parallel transistor of the first electrical path corresponding to the TDD and series and parallel transistors of the electronic paths excluding the first electrical path among the plurality of electrical paths.

* * * * *